(12) United States Patent
Byers et al.

(10) Patent No.: US 7,287,756 B2
(45) Date of Patent: Oct. 30, 2007

(54) FILM RIDING SHAFT SEAL

(75) Inventors: William A. Byers, Murrysville, PA (US); Gene J. Zottola, Pittsburgh, PA (US)

(73) Assignee: Westinghouse Electric Co LLC, Pittsburgh, PA (US)

(*) Notice: Subject to any disclaimer, the term of this patent is extended or adjusted under 35 U.S.C. 154(b) by 109 days.

(21) Appl. No.: 11/074,409

(22) Filed: Mar. 8, 2005

(65) Prior Publication Data
US 2005/0194748 A1 Sep. 8, 2005

Related U.S. Application Data

(60) Provisional application No. 60/551,092, filed on Mar. 8, 2004.

(51) Int. Cl.
*F16J 15/34* (2006.01)
(52) U.S. Cl. ............... 277/405; 277/348; 277/943
(58) Field of Classification Search ............... 277/399, 277/403, 405, 348, 943; 427/367, 370
See application file for complete search history.

(56) References Cited

U.S. PATENT DOCUMENTS

| 4,693,481 A | 9/1987 | Quinn |
| 4,792,146 A * | 12/1988 | Lebeck et al. ............... 277/360 |
| 4,838,559 A | 6/1989 | Guardiani et al. |
| 4,871,297 A | 10/1989 | Boes et al. |
| 4,978,487 A * | 12/1990 | Eiffler et al. ................. 264/121 |
| 4,990,054 A | 2/1991 | Janocki |
| 5,024,452 A * | 6/1991 | Bice ........................... 277/400 |
| 5,057,340 A | 10/1991 | Iyer et al. |
| 5,135,709 A | 8/1992 | Andresen et al. |
| 5,603,075 A | 2/1997 | Stoll et al. |
| 6,692,006 B2 | 2/2004 | Holder |
| 6,793,883 B2 | 9/2004 | Andresen et al. |
| 2004/0207158 A1* | 10/2004 | Agrawal et al. ............ 277/364 |

\* cited by examiner

*Primary Examiner*—William L. Miller

(57) ABSTRACT

The invention is a film-riding seal for a pump shaft that is resistant to the deposition of iron oxides such as hematite and goethite on the confronting, spaced apart, seal surfaces. The seal generally comprises a ceramic runner mounted on the pump shaft and an adjacent ceramic stationary sealing ring. The runner has a sealing surface and the stationary sealing ring has sealing surface confronting the runner sealing surface. The ceramic sealing surfaces include a catalyst selected from the group consisting of rhenium, ruthenium, rhodium, palladium, silver, osmium, iridium, platinum, gold and mixtures thereof.

Figure 1:
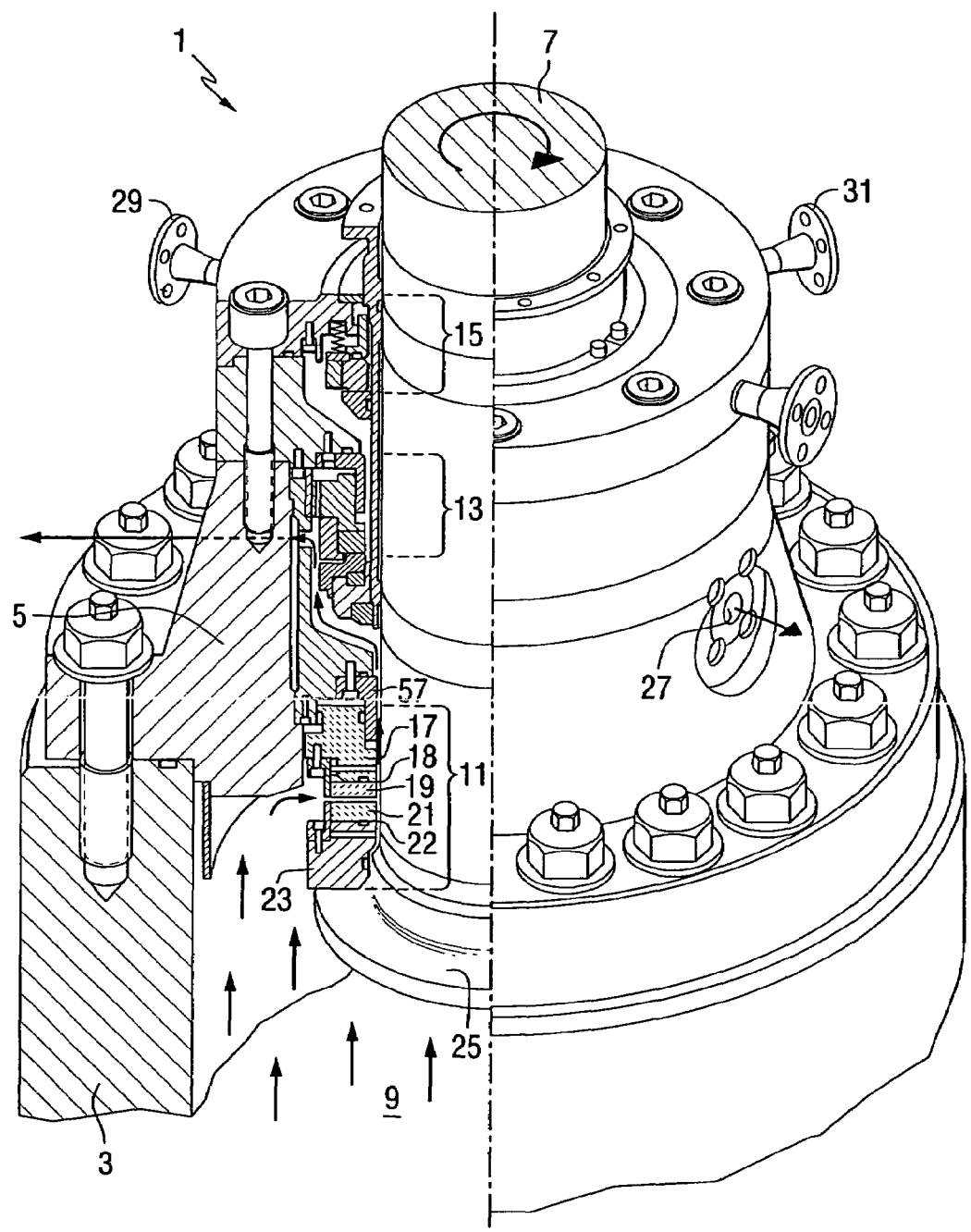

20 Claims, 2 Drawing Sheets

FILM RIDING SHAFT SEAL

CROSS REFERENCE

This application claims priority of Provisional Patent Application No. 60/551,092 filed Mar. 8, 2004.

BACKGROUND OF THE INVENTION

1. Field of the Invention

This invention generally relates to shaft seals, and is specifically concerned with a hydrostatic, film-riding seal that is useful for sealing the shaft of a pump used for pumping liquids at high pressures and temperatures such as a coolant water pump in nuclear power plant.

2. Description of the Prior Art

Coolant water pumps are used in commercial pressurized water nuclear reactors to continuously recirculate 100,000 gpm or more of coolant water through reactor coolant systems at temperatures of up to about 570° F. or higher and pressures of about 2250 psi or higher. A coolant water pump maintains the reactor coolant pressure and restricts leakage of coolant water along a rotating pump shaft with a series of shaft seals, including a primary seal assembly which is a hydrostatic, "film-riding" seal and secondary and tertiary friction (or "contacting" or "rubbing") type seal assemblies. Most of the 2250 psi pressure differential between the reactor coolant system pressure and the surrounding atmosphere is dropped across the primary seal assembly. The actual seal is formed by two confronting faceplates, one of which is stationary (known as the "ring") and the other of which turns with the pump shaft (known as the "runner"). Water is forced between the faceplates, which causes the faceplates to ride on a thin film of water that may be on the order of a half mil thick.

The correct flow of water between the faceplates of the primary seal (known as the "leak-off rate") must be maintained within specifications for proper functioning of the seal. Investigations have shown that out-of-specification leak-off rates are often caused by iron oxide deposits on one or both faceplates. The predominant iron oxide phase deposited on the faceplates was found to be $\alpha$-$Fe_2O_3$, i.e., the mineral hematite. In addition, lesser quantities of $\alpha$-FeOOH, the mineral goethite, have also been detected. The iron in both hematite and goethite is in the +3 valence state.

SUMMARY OF THE INVENTION

In its broadest sense, the invention is an improved film-riding seal for a pump shaft that is resistant to the deposition of iron oxides such as hematite and goethite on its confronting seal surfaces. The invention generally comprises a ceramic runner mounted on the pump shaft and a ceramic stationary sealing ring. The runner and the stationary sealing ring have confronting, spaced apart, sealing surfaces. At least one, but preferably both, of the sealing surfaces include a catalyst selected from the group consisting of rhenium, ruthenium, rhodium, palladium, silver, osmium, iridium, platinum, gold and mixtures thereof. In preferred embodiments of the invention, the runner and the stationary sealing ring are formed of a nitride, an alumina or a zirconia In one preferred embodiment, the runner and the stationary sealing ring are formed of a nitride such as silicon nitride and the catalyst is platinum. In another preferred embodiment, the runner and the sealing ring are formed of a nitride and the catalyst is iridium.

BRIEF DESCRIPTION OF THE DRAWING FIGURES

Figure 2:
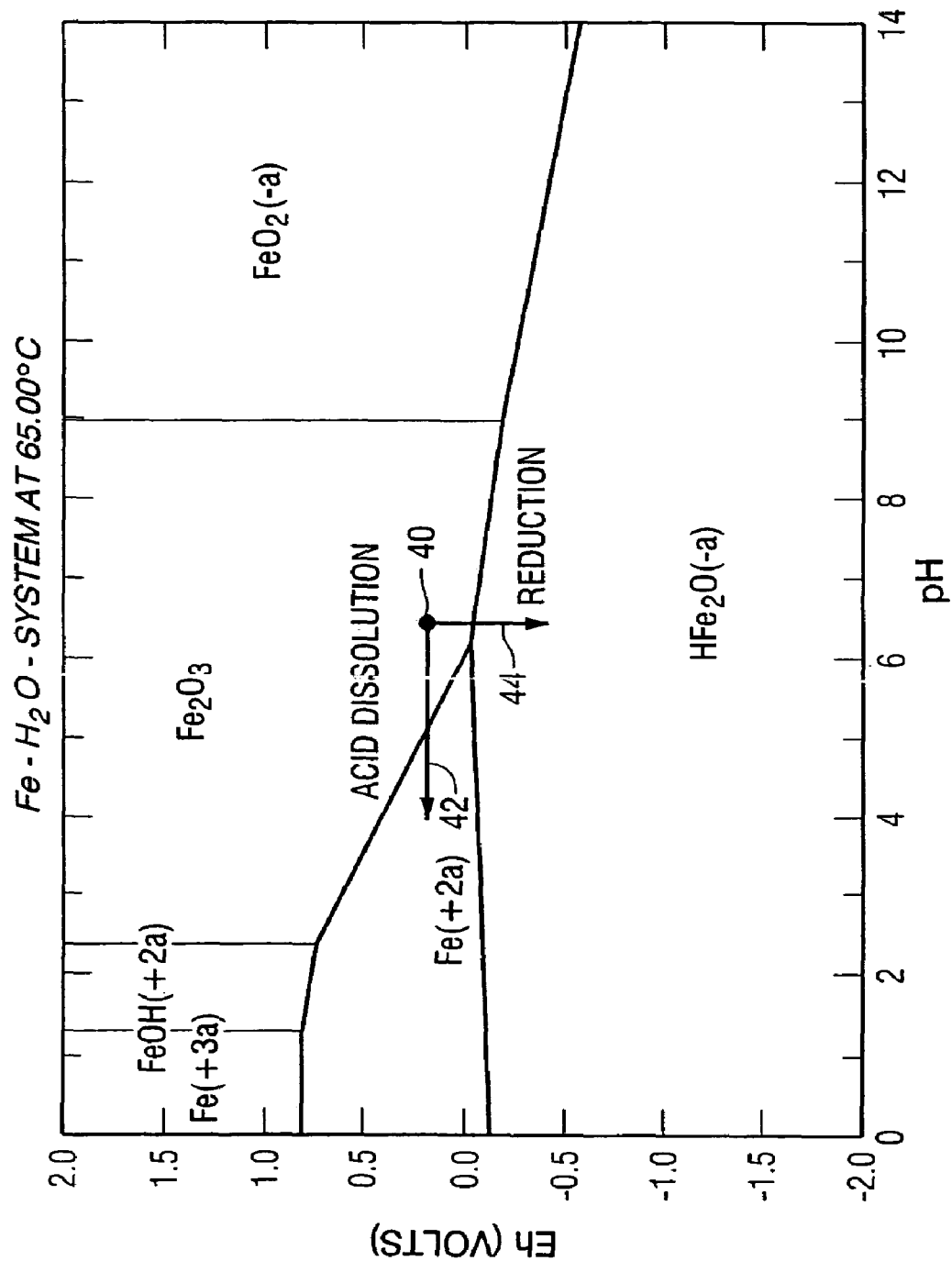

FIG. 1 is a cutaway perspective view of a coolant pump, illustrating a primary sealing assembly which surrounds the pump shaft; and FIG. 2 is a Pourbaix diagram indicating the stability of hematite deposits at 65° C.

DETAILED DESCRIPTION OF THE PREFERRED EMBODIMENT

With reference now to FIG. 1, the invention finds particular utility within the centrifugal water coolant pumps, represented by pump 1, used to circulate water through the radioactive core of a nuclear power station. Such a water coolant pump 1 generally has a pump casing 3 and a No. 1 seal housing 5. A pump shaft 7 is sealingly and rotatably mounted within the No. 1 seal housing 5. Although not specifically shown in FIG. 1, the bottom portion of the pump shaft 7 is connected to an impeller, while the top portion is connected to a high-horsepower, induction-type electrical motor. When the motor rotates the shaft 7, the impeller within the housing 9 pressurizes the water flowing through the pump housing from ambient pressure to approximately 2,250 psi. This pressurized water applies an upwardly directed, hydrostatic load upon the shaft 7 since the upper portion of the No. 1 seal housing 5 is surrounded by the ambient atmosphere.

In order that the pump shaft 7 might rotate freely within the No. 1 seal housing 5 while maintaining the 2,250 psi pressure boundary between the housing interior 9 and the outside of the No. 1 seal housing 5, the primary, secondary and tertiary sealing assemblies 11, 13 and 15, respectively, are provided in the positions illustrated. Most of the necessary pressure sealing is performed by the primary sealing assembly 11.

The primary sealing assembly 11 generally includes a sealing ring 17 which is stationarily mounted within the No. 1 seal housing 5 by a clamping ring 19, and a runner 23 which is mounted onto a flange 25 of shaft 7 by means of another clamping ring 21. The bottom surface of the sealing ring 17 and the top surface of the runner 21 form sealing surfaces 18 and 22, which are biased toward one another as a result of the fluid pressure load on the pump shaft 7. However, the sealing surfaces 18 and 22 normally do not frictionally engage on another, since the sealing surface 18 of the sealing ring 17 is tapered at a shallow angle with respect to the substantially flat and horizontal sealing surface 22 of the runner 23. Such tapering provides a flowing film of water between the sealing surfaces 18 and 22 of the sealing ring and the runner 21, which in turn allows the sealing ring 17 and runner 23 to rotate relative to one another in a "film-riding" mode. Because the primary sealing assembly 11 normally operates in a film-riding mode, some provision must be made for handling the water which "leaks off" in the annular space between the shaft 7, or within the No. 1 seal housing 5 which rotatably mounts the shaft 7. Accordingly, No. 1 seal housing 5 includes a primary leak-off port 27. Leak-off ports 29 and 31 accommodate water leakage from secondary and tertiary sealing assemblies 13 and 15, respectively. Coolant water pumps designed for use in plants designed by the assignee of the present invention may have leak-off rates of from about 1 to about 6 gallons/minute. See, in this regard, U.S. Pat. No. 4,693,481 which is incorporated by this reference for a more detailed description of the structure of reactor coolant pumps 1 and shaft seals.

The sealing ring 17 and the runner 23 may be formed of a ceramic material such as a nitride, an alumina or a zirconia. Preferably, the sealing ring 17 and the runner 23 are formed of a nitride. In a preferred embodiment both the sealing ring 17 and the runner 23 are formed from 98% pure, hot-pressed silicon nitride. Advantageously, such a material permits that the primary sealing assembly 11 to operate for a period of time in a non-film-riding mode should the coolant pump 1 fail to provide water pressurized enough to create the aforementioned film of flowing water between the sealing surfaces 18 and 22. The use of hot-pressed silicon nitride, in combination with the taper of the sealing surfaces 18 and 22, provides a shaft seal which is not only capable of operating in a non-film-riding mode (in the event of a malfunction or other emergency within the coolant pump 1), but also provides a shaft seal which is extremely durable and resistant to a variety of deleterious mechanical effects (e.g., as a result of "thermal shock"). See, in this regard, U.S. Pat. No. 5,057,340, which generally discloses a method for forming a ceramic coating on a sealing surface for a coolant water pump 1.

At least one, and preferably both, of the sealing surfaces 18 and 22 comprise one or a mixture of the following catalysts: rhenium, ruthenium, rhodium, palladium, silver, osmium, iridium, platinum, gold. Preferably the top 20 angstroms (20 Å) of the sealing surface 18 and/or 22 include at least 1%, and more preferably at least 15%, by weight of catalyst. Desirably, there is substantial particle-to-particle contact between catalyst particles for increasing the electrical conductivity of the sealing surfaces. In some embodiments, the catalyst particles form a coating (i.e., a film or thin layer) on the sealing surfaces 18 and 22. The catalyst may be added to the sealing surface 18 and/or the sealing surface 22 by any suitable technique, including precipitation from a molten salt or an aqueous solution, and plasma assisted vapor deposition.

A catalyst is added to the sealing surface 18 of the sealing ring 17 and/or the sealing surface 22 of the runner 23 for the following reasons. It is known that the iron oxide deposits tend to form on the sealing surfaces 18 and 22 of coolant water pumps 1 used in nuclear power stations at the end of on-line operations notwithstanding the use of very pure coolant water. Thus, it is theorized that the deposition of iron oxide is caused by the difference in conditions at the sealing surfaces 18 and 22 at the end of on-line cycles. Alloys in the system piping (including the chemical and volume control system and its supporting subsystems in light water nuclear reactors) corrode and release iron corrosion products into the coolant water. The released iron is a mixture of dissolved iron in the +2 valence state and colloidal FeOOH hydrates that are smaller than the pore size of the injection filters.

The colloidal FeOOH particles or FeOOH hydrates deposit on the sealing surfaces 18 and 22 through an electrophoretic mechanism. Thus, the small charged particles are attracted to the charged surfaces 18 and 22 of the stationary sealing ring 17 and the runner 23 in the region of highest flow. Also, the electrophoretic deposition is facilitated by low ionic strength and alkaline pH, which conditions occur at the end of on-line operations. The totally dissolved iron in the +2 valence state react with dissolved oxygen in the water at the sealing surfaces 18 and 22 to form insoluble iron in the +3 valence state. The iron in the +3 valence state precipitates on the sealing surfaces 18 and 22 to hold the particles in place. The iron oxide hydroxides then convert to a more thermodynamically stable hematite.

This process would be necessary for the deposition of layers more than one particle deep because iron oxide hydroxide deposits and iron oxide hydroxide colloidal particles will have the same electrostatic charge and will repel each other.

The chemistry conditions where hematite deposits are stable can be illustrated by means of a Pourbaix diagram (sometimes known as a Eh-pH plot). In such a diagram, the electrochemical potential (Eh or ECP) is plotted against pH, the negative log of the hydrogen concentration. The diagram is divided into regions of stability for different chemical species. FIG. 2 is a Pourbaix diagram that was generated for a temperature of 65° C., which is representative of typical coolant water pump seal temperatures. The iron concentration of FIG. 2 is $1.0 \times 10^{-7}$ mol/kg or 0.56 ppb. FIG. 2 shows that, even at this low iron concentration, hematite has a wide range of stability. At the end of a nuclear power station's on-line cycle, the pH of 65° C. seal injection may be in the 6.5 to 7 range. Because hematite commonly forms at the end of a cycle, the electrochemical potential must be positive.

The circle 40 imposed on FIG. 2 shows a likely Eh and pH for the seal injection water at the end of a nuclear power station's on-line cycle. The arrows 42 and 44 show the chemical changes that could most easily destabilize hematite and prevent deposition. As is shown by arrow 42, the injection fluid at the sealing surfaces 18 and 22 could be made more acid. As is shown by arrow 44 the electrochemical potential could be reduced to a negative value. The electrochemical potential can be lowered on the coolant pump seal 11 by changing the relative rates of the different surface chemical reactions on the sealing surfaces 18 and 22. The electrochemical potential at the sealing surfaces 18 and 22 is a mixed potential that is set primarily by the oxidation of hydrogen and the reduction of oxygen. Hydrogen is frequently controlled in the injection water during on-line operations at a concentration of from 25 to 50 cc/kg $H_2O$ and oxygen concentrations in the ppb to ppm range can be introduced through the station's make-up system.

$$H_2 + 2OH^- \leftrightarrows 2H_2O + 2e^- \quad \text{(Equation 1)}$$

$$\tfrac{1}{2}O_2 + 2H^+ + 2e^- \leftrightarrows H_2O \quad \text{(Equation 2)}$$

These reactions do not occur appreciably in solution at 65° C. Rather, they take place at surfaces. The oxidation of hydrogen (Equation 1) tends to push surfaces to negative potentials, while the reduction of oxygen (Equation 2) tends to push surfaces to positive electrochemical potentials.

The oxygen reduction reaction (Equation 2) is kinetically favored on most oxide surfaces such as on thin $SiO_2$ layers that may form on ceramic sealing rings 17 and runners 23 in water or hematite that may deposit on the sealing surfaces 18 and 22 of sealing rings 17 and runners 23. Thus, even thought the amount of oxygen in the water is typically low compared with the hydrogen, the oxygen reduction reaction (Equation 2) still pushes the electrochemical potential at the sealing surfaces 18 and 22 in the positive direction. As a result, the hematite remains stable and any $Fe^{+2}$ in solution may be oxidized to form additional $Fe^{+3}$.

The hydrogen oxidation reaction can be accelerated by an oxidation catalyst on the surfaces 18 and 22. Thus, a catalyst such as platinum or iridium may be added to change the chemistry at the sealing surfaces 18 and 22. The catalyst catalyzes the hydrogen oxidation reaction (Equation 1) by promoting dissociation of adsorbed hydrogen gas to produce hydrogen adatoms. The adatoms can easily give up electrons or can react directly with oxygen adatoms on the surface of the platinum. The catalytic element does not need to be chemically combined with the ceramic material in the sealing ring 17 or the runner 23. In preferred embodiments, the catalytic element may fill the pores of the ceramic material. For example, the outer 20 microns adjacent silicon nitride surfaces 18 and 22 may be more than 40% porous. Preferably, in applications where the injection water contains substantial amounts of dissolved hydrogen, silicon nitride sealing rings 17 and runners 23 contain platinum. In applications where the injection water contains hydrazine, silicon carbide sealing rings 17 and runners 23 preferably contain iridium.

The catalyst results in the injection of more electrons into the sealing surfaces 18 and 22. Thus, the electrochemical potential becomes more negative. At the same time, the surfaces 18 and 22 become more acidic because OH ions are consumed in the hydrogen oxidation reaction (Equation 1). In addition, Fe+2 is no longer oxidized to form $Fe^{+3}$ deposits. Instead, the process is reversed and the $Fe^{+3}$ deposits on the sealing surfaces 18 and 22 are converted to dissolved $Fe^{+2}$ species in solution. Also, the lower surface pH also helps to keep iron from precipitating and will help dissolve any iron deposits that may form by some other mechanism. Accordingly, the catalytic element is added in an amount that is effective to increase the electrical conductivity of the sealing surfaces 18 and 22.

While a present preferred embodiment of the present invention has been shown and described, it is to be understood that the invention may be otherwise variously embodied within the scope of the following claims of invention.

What is claimed is:

1. A film-riding seal for a pump shaft, comprising:
   a. ceramic runner mounted on the pump shaft, the ceramic runner having a sealing surface;
   a ceramic stationary sealing ring having a sealing surface confronting and spaced from the runner sealing surface;
   wherein at least one of the confronting surfaces comprises a hydrogen oxidation catalyst selected from the group consisting of rhenium, ruthenium, rhodium, palladium, silver, osmium, iridium, platinum, gold and mixtures thereof, whereby said hydrogen oxidation catalyst provides resistance to deposition of iron oxides on the at least one confronting surface.

2. The film-riding seal of claim 1, wherein the ceramic of the runner and the ceramic of the sealing ring are selected from the group consisting of nitrides, alumina and zirconia.

3. The film-riding seal of claim 2, wherein the ceramic of the runner and the ceramic of the sealing ring are silicon nitride.

4. The film-riding seal of claim 3, wherein the catalyst of the runner or of the sealing ring is platinum or iridium.

5. The film-riding seal of claim 1, wherein the catalyst of the runner or of the sealing ring is platinum.

6. The film-riding seal of claim 1, wherein the catalyst of the runner or of the sealing ring is iridium.

7. The film-tiding seal of claim 1, wherein the top 20 angstroms adjacent the sealing surface of the runner or the sealing surface of the sealing ring comprises at least 1 wt. % of catalyst.

8. The film-riding seal of claim 1, wherein the top 20 angstroms adjacent the sealing surface of the runner or the sealing surface of the sealing ring comprises at least 15 wt. % of catalyst.

9. The film-riding seal of claim 1, wherein the catalyst forms a coating on the sealing surface of the runner or of the sealing ring.

10. The film-riding seal of claim 1, wherein the catalyst is effective to increase the electrical conductivity of the sealing surface of the runner or of the sealing ring.

11. The film-riding seal of claim 1, the sealing surface of the runner or of the sealing ring having a negative electro chemical potential when in contract with water at 65° C. and pH of 6.5-7.

12. A film-riding seal for a pump shaft, comprising:
   a ceramic runner mounted on the pump shaft, the ceramic runner having a sealing surface;
   a ceramic stationary sealing ring having a sealing surface confronting and spaced from the runner sealing surface;
   wherein at least one of the confronting surfaces comprises a hydrogen oxidation catalyst selected from the group consisting of rhenium, ruthenium, rhodium, palladium, silver, osmium, iridium, platinum, gold-and mixtures thereof whereby said hydrogen oxidation catalyst provides resistance to deposition of iron oxides on the at least one confronting surface and the at least one confronting surface has a hematite unstable electrochemical potential when in contact with water at 65° C. and a pH of 6.5-7.

13. The film-riding seal of claim 12, wherein the ceramic of the runner and the ceramic of the sealing ring are selected from the group consisting of nitrides, alumina and zirconia.

14. The film-riding seal of claim 12, wherein the catalyst of the runner or of the sealing ring is platinum.

15. The film-riding seal of claim 12, wherein the catalyst of the runner or of the sealing ring is iridium.

16. A film-riding seal for a pump shaft, comprising:
   a ceramic runner mounted on the pump shaft, the ceramic runner having a sealing surface;
   a ceramic stationary sealing ring having a sealing surface spaced from the runner sealing surface;
   wherein at least one of the sealing surfaces comprises a hydrogen oxidation catalyst selected from the group consisting of rhenium, ruthenium, rhodium, palladium, silver, osmium, iridium, platinum, gold and mixtures thereof whereby said hydrogen oxidation catalyst provides resistance to deposition of iron oxides on the at least one sealing surface.

17. The film-riding seal of claim 16, wherein the ceramic of the runner and the ceramic of the sealing ring are is selected from the group consisting of nitrides, alumina and zirconia.

18. The film-riding seal of claim 16, wherein the catalyst of the runner or of the sealing ring is platinum.

19. The film-riding seal of claim 16, wherein the catalyst of the runner or of the sealing ring is iridium.

20. The film-riding seal of claim 16, wherein the top 20 angstroms adjacent the sealing surface of the runner or the sealing surface of the sealing ring comprises at least 1 wt. % of catalyst.

* * * * *